No. 688,533. Patented Dec. 10, 1901.
S. LOE.
VOTING MACHINE.
(Application filed Mar. 25, 1901.)
(No Model.) 11 Sheets—Sheet 1.

Fig. 1

Witnesses.
A. H. Opsahl.
C. H. Turner.

Inventor.
Syver Loe
By his Attorneys
Williamson & Merchant

No. 688,533. Patented Dec. 10, 1901.
S. LOE.
VOTING MACHINE.
(Application filed Mar. 25, 1901.)
(No Model.) 11 Sheets—Sheet 2.

No. 688,533. Patented Dec. 10, 1901.
S. LOE.
VOTING MACHINE.
(Application filed Mar. 25, 1901.)
(No Model.) 11 Sheets—Sheet 3.

No. 688,533. Patented Dec. 10, 1901.
S. LOE.
VOTING MACHINE.
(Application filed Mar. 25, 1901.)
(No Model.) 11 Sheets—Sheet 4.

Witnesses
A. H. Opsahl.
C. H. Turner.

Inventor.
Syver Loe
By his Attorneys
Williamson Merchant

No. 688,533. Patented Dec. 10. 1901.
S. LOE.
VOTING MACHINE.
(Application filed Mar. 25, 1901.)

(No Model.) 11 Sheets—Sheet 5.

No. 688,533. Patented Dec. 10, 1901.
S. LOE.
VOTING MACHINE.
(Application filed Mar. 25, 1901.)
(No Model.) 11 Sheets—Sheet 6.

Witnesses
A. H. Opsahl
C. H. Turner

Inventor
Syver Loe
By his Attorneys
Williamson & Merchant

No. 688,533. Patented Dec. 10, 1901.
S. LOE.
VOTING MACHINE.
(Application filed Mar. 25, 1901.)
(No Model.) 11 Sheets—Sheet 7.

Fig. 17.

Witnesses.
A. H. Opsahl.
C. H. Turner.

Inventor.
Syver Loe
By his Attorneys.
Williamson & Merchant

No. 688,533. Patented Dec. 10, 1901.
S. LOE.
VOTING MACHINE.
(Application filed Mar. 25, 1901.)
(No Model.) 11 Sheets—Sheet 9.

Fig. 14.

Witnesses
Inventor.
By his Attorneys

No. 688,533. Patented Dec. 10, 1901.
S. LOE.
VOTING MACHINE.
(Application filed Mar. 25, 1901.)

(No Model.) 11 Sheets—Sheet 10.

Witnesses.
A. H. Opsahl.
C. H. Turner.

Inventor.
Syver Loe
By his Attorneys.
Williamson & Merchant

THE NORRIS PETERS CO., PHOTO-LITHO., WASHINGTON, D. C.

No. 688,533. Patented Dec. 10, 1901.
S. LOE.
VOTING MACHINE.
(Application filed Mar. 25, 1901.)
(No Model.) 11 Sheets—Sheet 11.

Fig. 18.

Witnesses.
A. H. Opsahl.
C. H. Turner.

Inventor.
Syver Loe
By his Attorneys
Williamson & Merchant

UNITED STATES PATENT OFFICE.

SYVER LOE, OF MINNEAPOLIS, MINNESOTA, ASSIGNOR OF ONE-HALF TO OLAF HOFF, OF NEW YORK, N. Y.

VOTING-MACHINE.

SPECIFICATION forming part of Letters Patent No. 688,533, dated December 10, 1901.

Application filed March 25, 1901. Serial No. 52,755. (No model.)

*To all whom it may concern:*

Be it known that I, SYVER LOE, a citizen of the United States, residing at Minneapolis, in the county of Hennepin and State of Minnesota, have invented certain new and useful Improvements in Voting-Machines; and I do hereby declare the following to be a full, clear, and exact description of the invention, such as will enable others skilled in the art to which it appertains to make and use the same.

My present invention relates to voting-machines, and has for its object to improve the same in the several particulars hereinafter noted.

The invention consists of the novel devices and combinations of devices hereinafter described, and defined in the claims.

A machine embodying the several features of my said invention is illustrated in the accompanying drawings, wherein like characters indicate like parts throughout the several views.

The construction of the machine illustrated may be outlined by the following statement: The registers and register-actuators are arranged in vertically-disposed series. The different series of registers and register-actuators are appropriated to different political tickets—such, for instance, as the national ticket, (presidential electors,) the State ticket, the county ticket, and the city or municipal ticket. Each series of registers and actuators is subdivided into groups, the number in a particular group being equal to the number of candidates for the particular office. For each group of registers and actuators there is a stop or limiting device of novel construction, which operates, after the predetermined number of votes (one or more) which may be properly voted for the particular office have been cast or selected, to lock or render inoperative all other of the register-actuators of that group. In each series there are also registers and register-actuators for recording straight party votes, question votes, and irregular votes.

As another feature I provide register-actuators or actuating-slides, which are arranged to be moved one at a time from their normal positions into so-called "set" positions without operating the corresponding registers. In fact, these actuating-slides may be moved individually to and from their set positions without action on the registers. This construction permits the voter to change his vote by moving back to normal position an actuating-slide previously set and then moving another slide into its set position. After the proper number of actuating-slides have been set to register the voter's entire vote—that is, all the votes to which he is entitled—these slides are simultaneously returned to their normal positions by means of a resetting-bar, under action of which bar the said actuators are rendered operative on their respective registers.

A novel mechanism is also provided for registering so-called "irregular" votes or votes for parties not represented on the political tickets.

Other novel features will hereinafter appear in the following detail description.

In the accompanying drawings like characters indicate like parts throughout the several views.

Fig. 11 is a skeleton view with some parts broken away and others removed, showing the parts of the cabinet or case in transverse vertical section.

Figure 1:
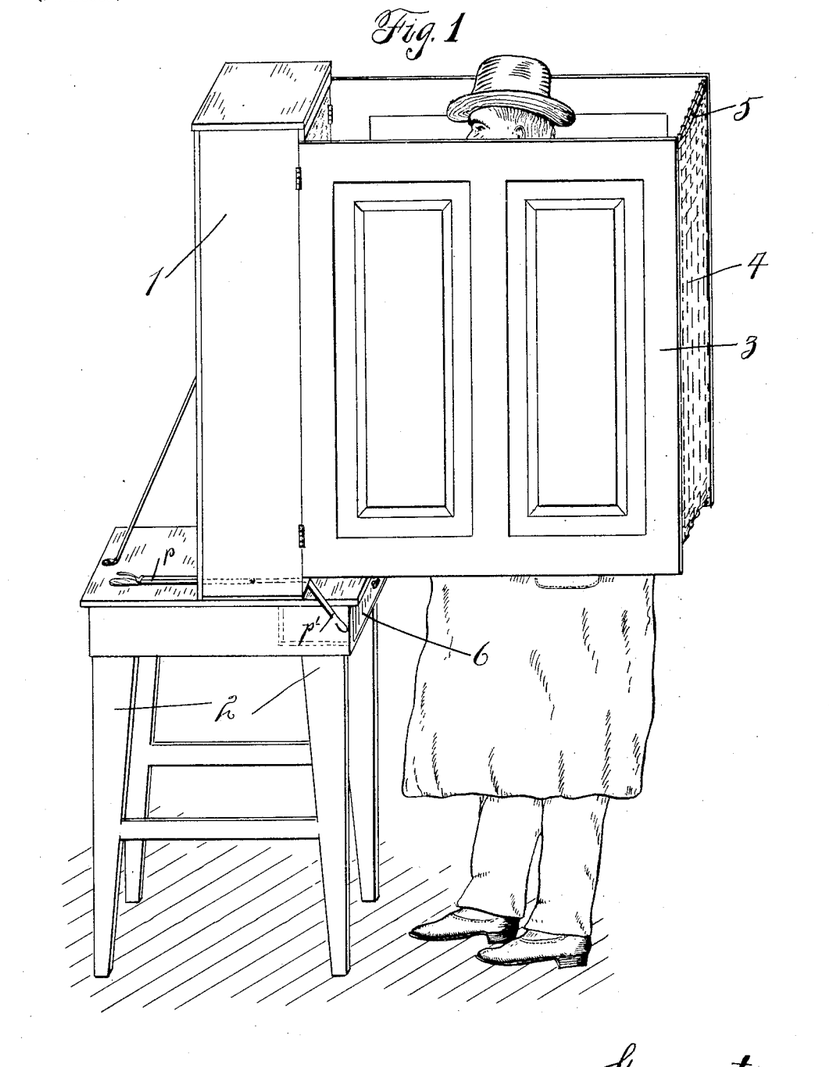
Figure 1 is a perspective view illustrating one of my improved voting-machines with a folding booth attachment applied in a working position thereto and showing a voter within the booth.
Figures 2, 3:
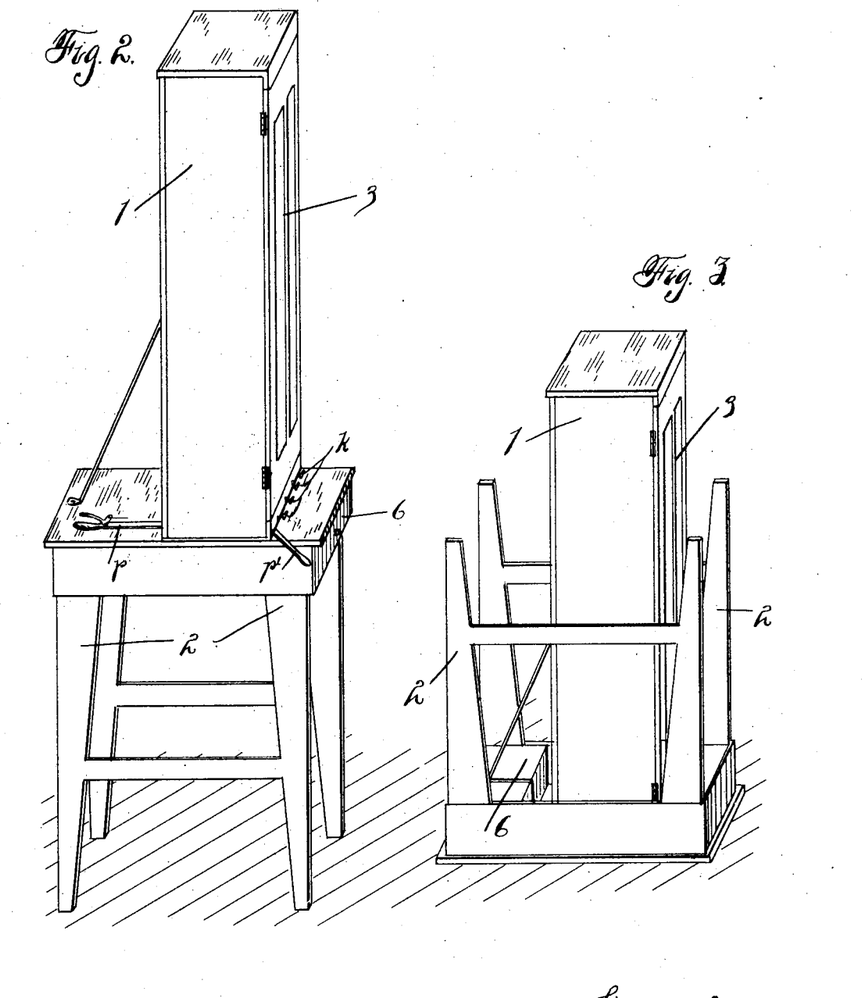
Fig. 2 is a perspective view showing the booth-forming leaves of the cabinet folded.
Fig. 3 is a perspective view showing the complete device, including the cabinet, its contents, the booth-forming leaves, and the supporting-table, as they will appear when packed for storage or shipment.

The cabinet or case 1, which is of rectangular box-like form and is open at its front face, is shown as supported by a suitable table 2. At its sides and at its open face the cabinet 1 is provided with hinged leaves 3, which when folded are adapted to overlap the one with the other and to cover and close the open face of the said cabinet. A suitable booth is afforded when the leaves 3 are opened up by the coöperation therewith of a curtain 4, which is suspended from a spacing-rod 5, suitably secured at its ends to the outer and upper part of the leaves 3, as shown in Fig. 1. The table 2 is shown as provided with a drawer 6, into which a plurality (as shown, four) of slots 7 open through the table-top just in front of the cabinet 1. This construction may of course be varied in many ways.

In the machine illustrated four rectangular compartment-boxes 8 are placed side by side, extending from top approximately to bottom thereof. These compartment-boxes 8 are preferably constructed of metal and adapted to be removed bodily from the cabinet, although this is not necessarily the case. Each compartment-box 8 has mounted within it a series of registers or tallies and the corresponding series of register-actuating slides, together with coöperating devices.

The registers or tallies, which may be of any suitable construction, are indicated as entireties by the character $a$. As shown, these registers comprise each three numeral-wheels mounted between spacing-plates 9 of the box 8. The front wheel of each tally has a ratchet $a'$ for a purpose which will hereinafter appear, and any ordinary well-known or suitable device may be provided for causing the one numeral-wheel of the tally to carry onto the other.

The register-actuating slides $b$ are located in horizontal planes, one over the other, and they are mounted with freedom for operative movements transversely of the machine and for limited movements from front to rear thereof in suitable seats formed in vertically-extended partitions 10 of the box 8. For this construction see particularly Figs. 5, 7, and 14. Each slide $b$ has a finger-piece or key-head $b'$, which works outward through a suitable slot in the front of the box 8 and by means of which the slide may be manipulated by the voter. Each slide $b$ has also a ratchet-pawl $b^2$, which at the proper time engages the ratchet-teeth $a'$ of the corresponding register. Each actuating-slide $b$ has two detents, shown in the form of notches $b^3$ $b^4$, which are engageable with a shoulder $10^b$ of one of the partitions 10. Also each slide $b$ in the preferred construction is provided with a pivoted lock-actuating dog $b^5$, formed at one end with a nose $b^6$ and mounted for a limited movement at its other end within a slotted keeper $b^7$ of the slide $b$, to which the said dog is pivoted. A spring $b^8$, applied to the dog $b^5$ and to one side of the box 8, as shown in Figs. 8 and 10, acting through the dog $b^5$, yieldingly holds the one or the other of the notches $b^3$ $b^4$ in an engagement with the shoulder $10^b$ and the actuating-slide either in its normal or its set position, as the case may be. It may be here further remarked that in its preferred construction each actuating-slide $b$ is provided with a cam-surface $b^9$, a bearing-surface $b^{10}$, a stop $b^{11}$, and a lock-lug $b^{12}$, having a shoulder $b^{13}$, all as shown in Figs. 5 and 7 and for purposes which will hereinafter appear.

Figure 14:
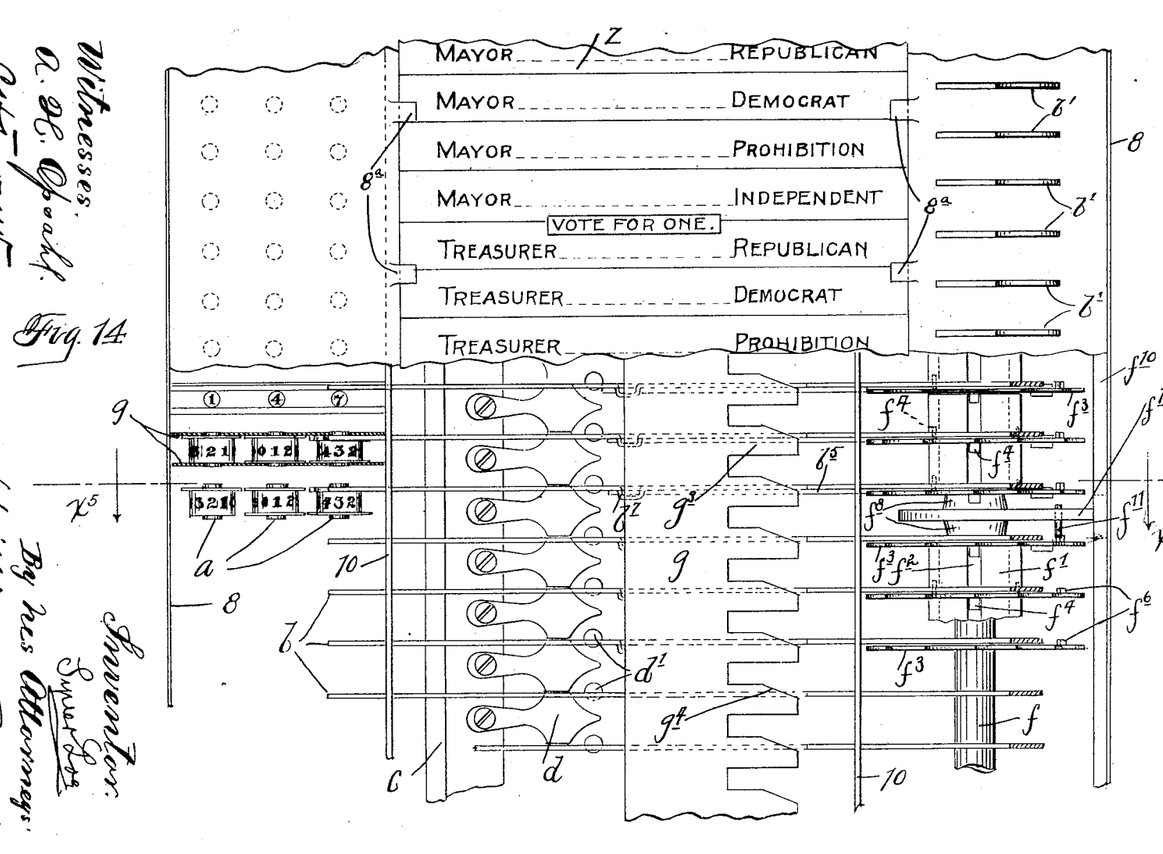
Fig. 14 is a front elevation of the central portion of one of the compartments of the machine, some parts being broken away and others being sectioned.

For coöperation with each series of actuating-slides $b$ is a so-called "restoring-bar" $c$, which extends from top to bottom of the box 8 and is mounted for pivotal movement on vertically-projecting trunnions $c'$, that project through horizontal bottom and top partition-plates 11 of the box 8. Normally the resetting-bar $c$ stands as indicated by full lines in Figs. 8 and 10, and it is adapted to move into the position indicated by dotted lines in Fig. 8, as will hereinafter more fully appear in the description of the operation. To the laterally-projecting flange of the bar $c$ is pivotally secured a series of cam-heads $d$, having pointed outer ends and normally lying in quite close contact, as best shown in Figs. 5, 7, and 14. Each actuating-slide $b$ is provided with a cam stud or projection $d'$, which normally stands between the beveled ends of two adjacent cam-heads $d$. The series of cam-heads $d$ act as an escapement to permit the movement of only one actuating-slide at a time. When one of the actuating-slides is moved toward its set position, its cam-stud $d'$ will force its way between the adjacent heads $d$, and thereby move the entire series of cam-heads into positions which will lock the other actuating-slides in their normal positions. When, however, an actuating-slide has been moved completely to its set position, its cam-stud $d'$ will have passed clear of the wide portions of the coöperating cam-heads $d$, as shown by full lines in Fig. 7, and any other actuating-slide may then be moved to its set position. When the restoring-bar $c$ is moved into its resetting position, the escapement cams or heads $d$ will be raised into inoperative positions, as indicated by dotted lines in Fig. 5.

Figure 5:
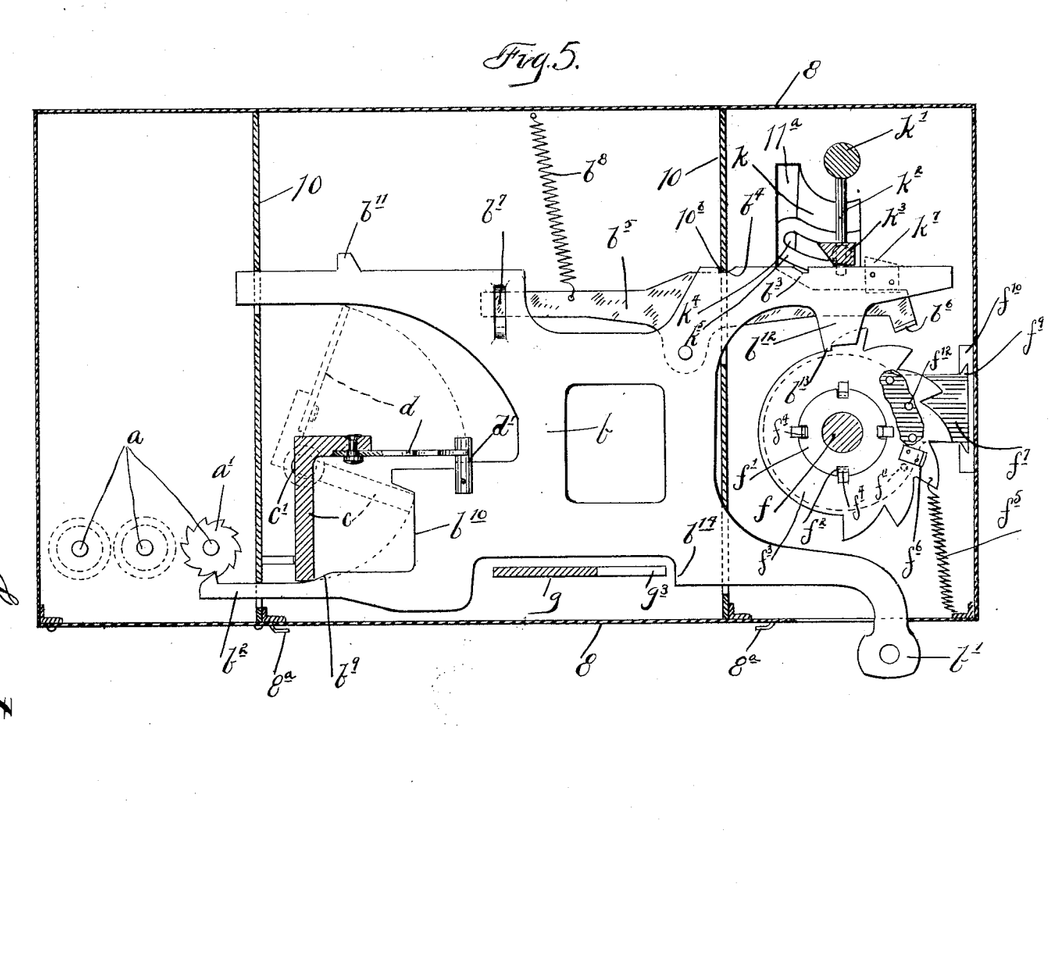
Fig. 5 is a horizontal section through one of the compartments of the machine on the line $x^5$ $x^5$ of Fig. 14.
Figure 6:
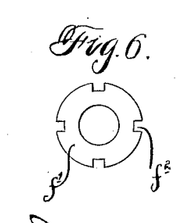
Fig. 6 is a detail in side elevation of the coupling-thimbles.
Figure 7:
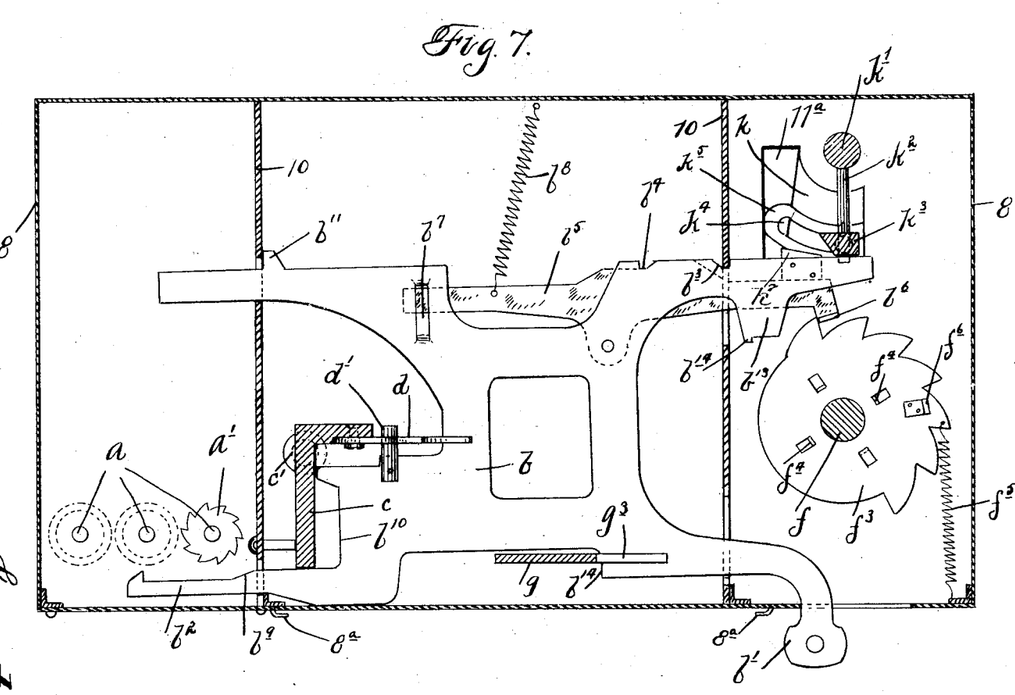
Fig. 7 is a view corresponding to Fig. 5, but illustrating different positions of certain of the parts, some parts being broken away.
Figures 8, 9, 10:
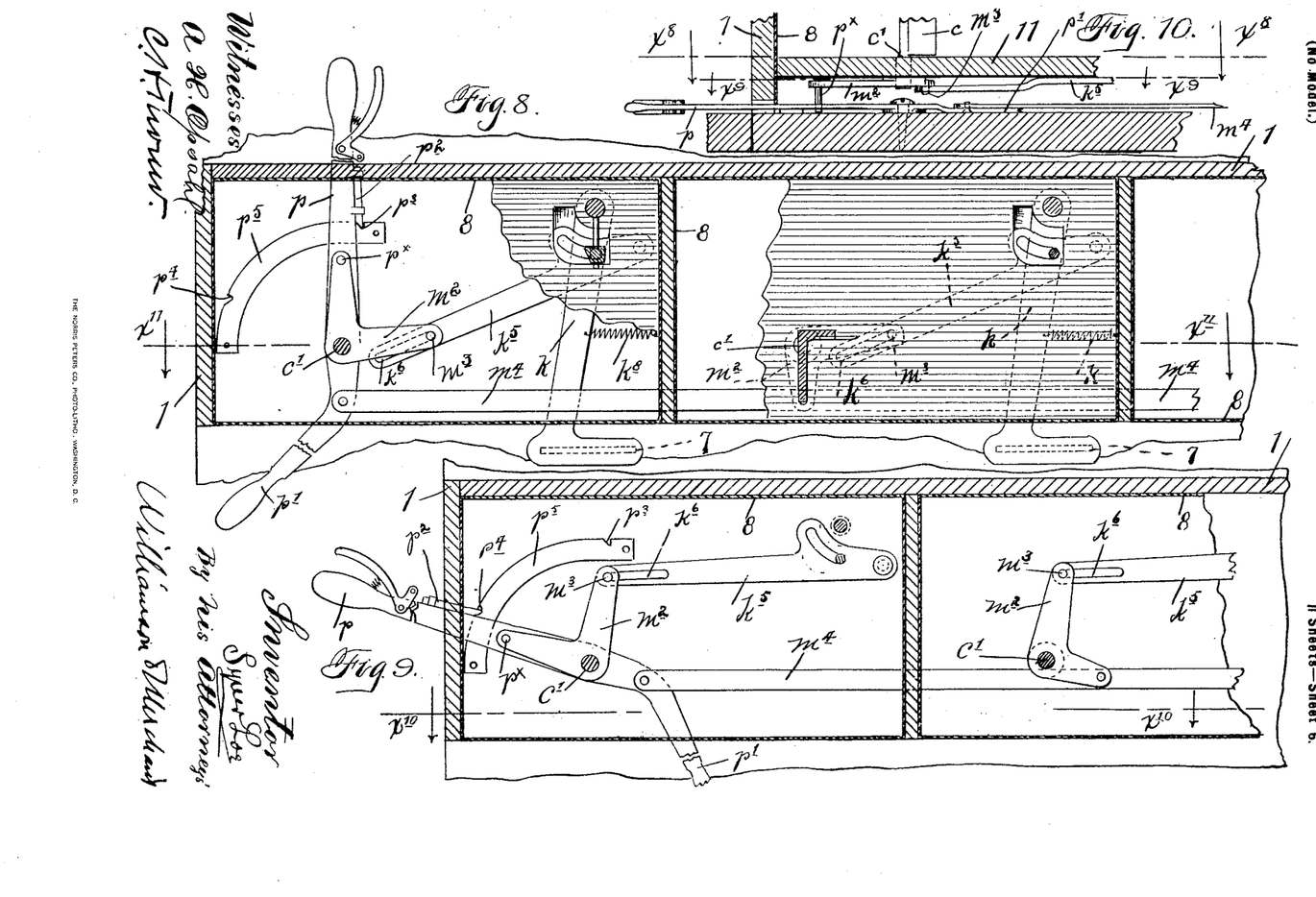
Fig. 8 is a diagrammatic section approximately on the line $x^8$ $x^8$ of Figs. 10 and 11, some parts being broken away and others being removed.
Fig. 9 is a horizontal section approximately on the line $x^9$ $x^9$ of Figs. 10 and 11.
Fig. 10 is a detail in vertical section on the line $x^{10}$ $x^{10}$ of Fig. 9, some parts being broken away.

The limiting lock mechanism is best indicated in Figs. 5, 7, and 14, wherein the character $f$ indicates a vertical shaft or spindle, which need not be rotary, but is suitably supported at its upper and lower ends in the horizontal partition-plates 11 of the compartment-box 8. On this spindle $f$ is placed a series of loose thimbles $f'$, which, as shown, are provided with longitudinal grooves $f^2$. Between the thimbles $f'$ are placed thin ratchet-wheels $f^3$, which are provided with reversely-projecting lugs $f^4$, as shown, two projecting in each direction and engaging the grooves $f^2$ of adjacent thimbles $f'$. In this way a whole group of thimbles $f'$ and ratchet-wheels $f^3$ are locked together for common rotation. The thimbles $f'$ and ratchet-wheels $f^3$ are grouped to correspond to the grouping of the registers and register-actuating slides. To illustrate, suppose the particular group to be appropriated to the office of judge of the district court, there being twelve candidates, and four judges to be elected. In this case a group of twelve ratchet-wheels $f^3$ will be connected by the thimbles $f'$ for common rotation. At least one ratchet-wheel of each group is connected by a spring $f^5$ to a suitable portion of the box 8, as best shown in Figs. 5 and 7. Each ratchet-wheel of the group is provided with a circumferentially-adjustable lock-lug $f^6$, which when moved to its limit will pass under the lug $b^{12}$ of the coöperating slide $b$ and against the stop-shoulder $b^{13}$ thereof, and thereby lock the said slide in its normal position by preventing disengagement of its detent $b^4$ from the coöperating shoulder $10^b$. In the concrete illustration just assumed it will require four steps of movement to throw the lock-lugs $f^6$ into their locking positions. As is evident, whenever an actuating-slide $b$ of the group is moved the nose $b^6$ of the dog $b^5$ of the said slide will engage with a tooth of the coöperating ratchet-wheel $f^3$ and will impart a step of movement thereto. It is also evident that the actuating-slides of the group may be operated in any order and that when the fourth has been moved to its set position all of the rest of the slides of the group will be locked in their normal positions, as just indicated.

The groups of limiting-stops or ratchet-wheels $f^3$ are separated by spacing-brackets $f^7$, which, as shown, have hubs $f^8$, surrounding the spindle $f$, and are provided with dovetailed projections $f^9$, which work adjustably in the dovetailed groove of a vertically-disposed retaining-bar $f^{10}$, secured on one side of the box 8. Each bracket $f^7$ is provided with a stop-pin $f^{11}$, (see Figs. 5 and 14,) which is adapted to engage with the lock-lug $f^6$ of the adjacent ratchet-wheel $f^3$ of one of the groups and to thereby determine the normal positions of the entire group of said wheels $f^3$. By moving the stop-pin $f^{11}$ into different holes $f^{12}$ in the bracket $f^7$ the ratchet-wheels of a particular group may be so set that their lock-lugs $f^6$ will be moved into locking positions by one movement or by a greater number of movements, according to the number of votes which may properly be recorded for the particular office to which the group is appropriated.

Figure 4:
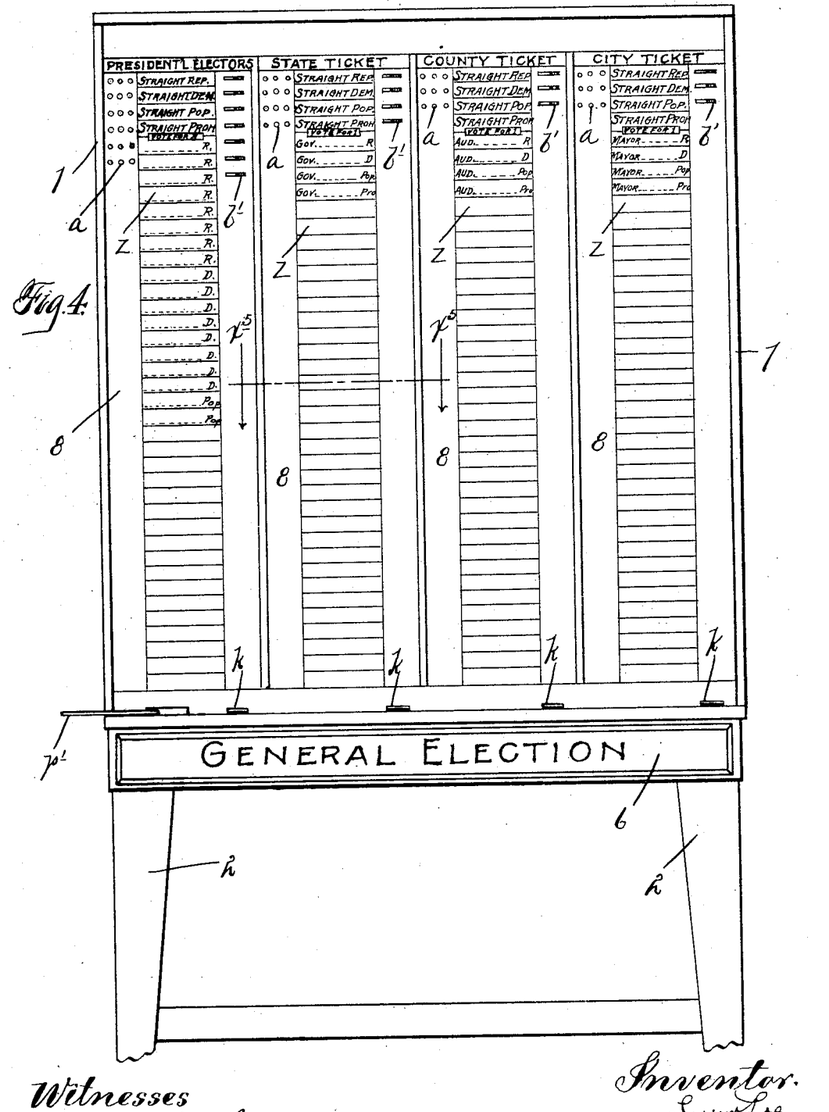
Fig. 4 is a view in front elevation with some parts broken away looking at the keyboard or face of the cabinet and voting-machine proper.
Figures 15, 16, 17:
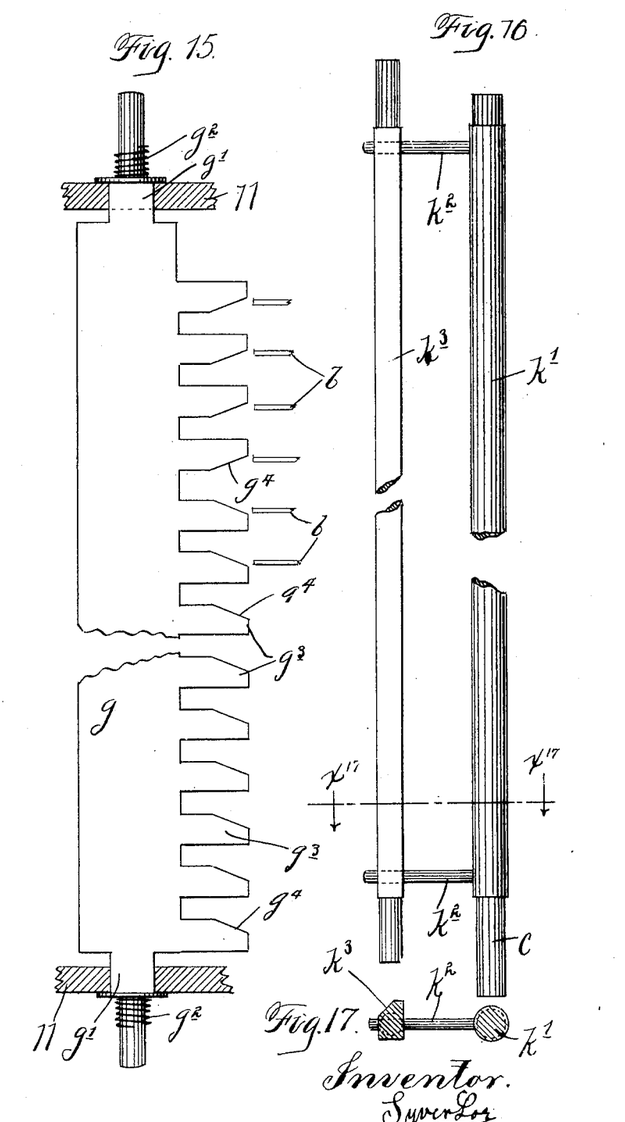
Fig. 15 is a detail view, in front elevation, showing the so-called "straight-vote lock-bar" and also portions of the support therefor and certain of the register-actuators which act thereon.
Fig. 16 is a detailed view, with some parts broken away, showing the so-called "irregular-vote controlling-bail.
" Fig. 17 is a section on the line $x^{17}$ $x^{17}$ of Fig. 16.
Figure 17:
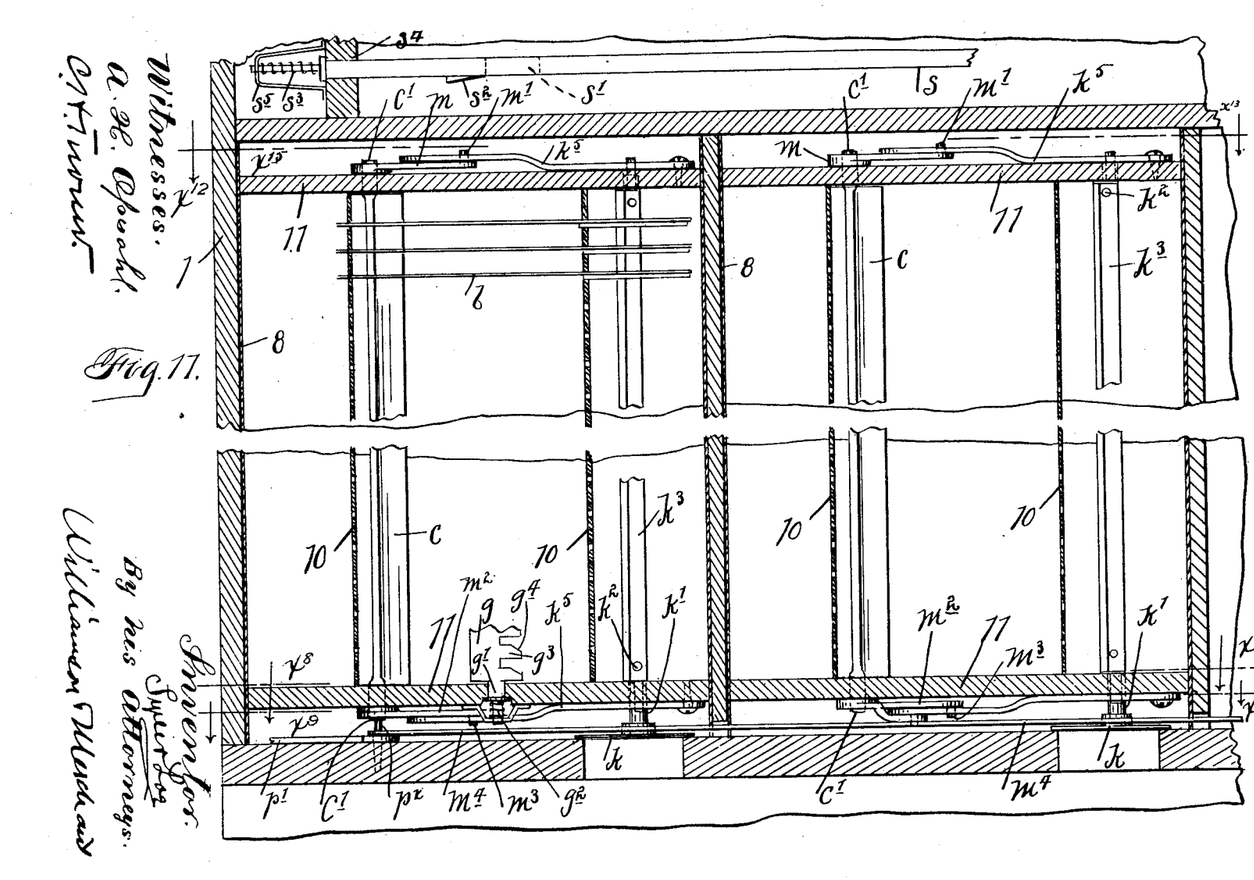
Figure 18:
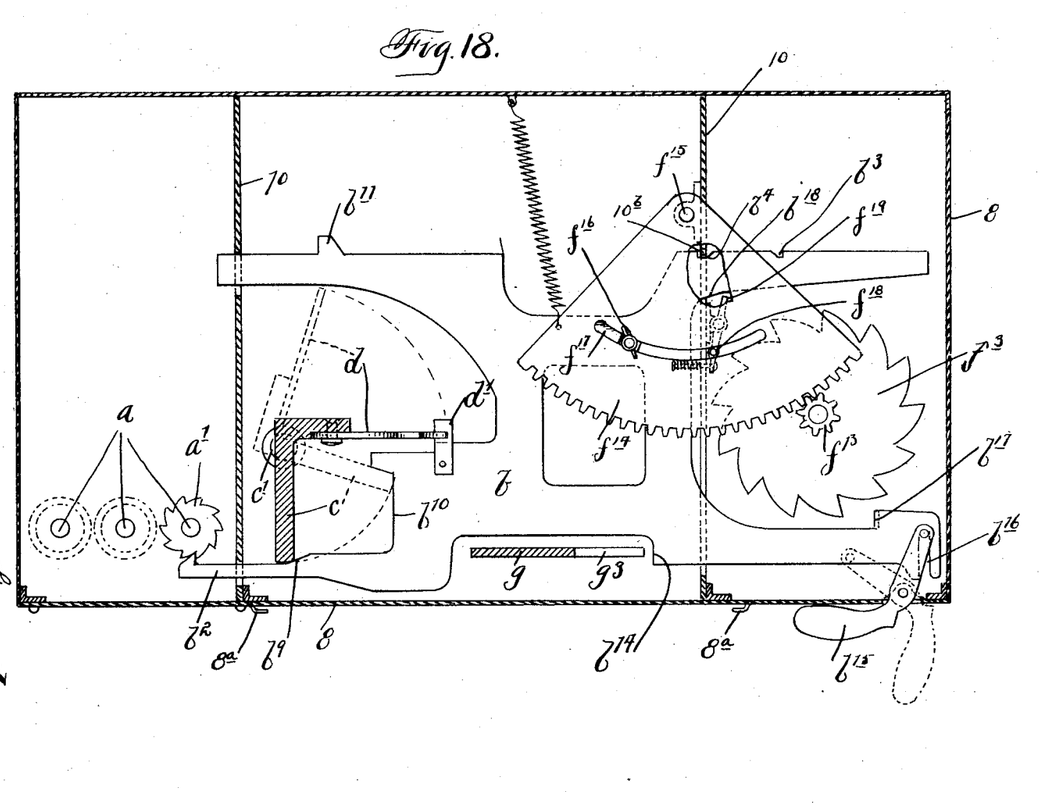
Fig. 18 is a view corresponding to Fig. 5, but illustrating a modified construction.

When the machine is to be used for a final election and where there are four parties represented, the four registers and register-actuators at the top of each series are used to record straight votes, as indicated in Fig. 4. Of course if a party chooses to vote a straight ticket he must be prevented from registering any further votes for that ticket, and vice versa. To accomplish this, I employ a cam-bar preferably constructed as best shown in Fig. 15. This cam-bar $g$ acts as a lock-plate and is preferably provided with reduced ends or trunnions $g'$, which work through the top and bottom partition-plates 11 of the box 8. Springs $g^2$, applied to the projecting ends of the trunnions $g'$, yieldingly hold the bar $g$ in its normal position with freedom for a limited movement either upward or downward. At one edge the bar $g$ is provided with a series of stop lugs or projections $g^3$, one for each actuating-slide $b$. Each stop-lug $g^3$ is provided with a beveled or cam surface $g^4$, which normally stands in the path of movement of a shoulder $b^{14}$ of the corresponding slide $b$. The cam-surfaces $g^4$ of the four upper lugs $g^3$, which coöperate with the straight-vote keys, are beveled, so that when acted upon by one of the straight-vote slides the bar $g$ will be raised far enough to throw the other stop-lugs $g^3$ in front of the other actuating-slides $b$, and thereby lock in their normal positions all of those actuating-slides which are appropriated to individual candidates. On the other hand, all but the said upper four lugs $g^3$ are so beveled that when one of the cam-surfaces $g^4$ is engaged by the corresponding actuating-slide $b$ it will draw the said cam-bar $g$ downward and in a similar manner lock all of the straight-vote keys.

Figure 12:
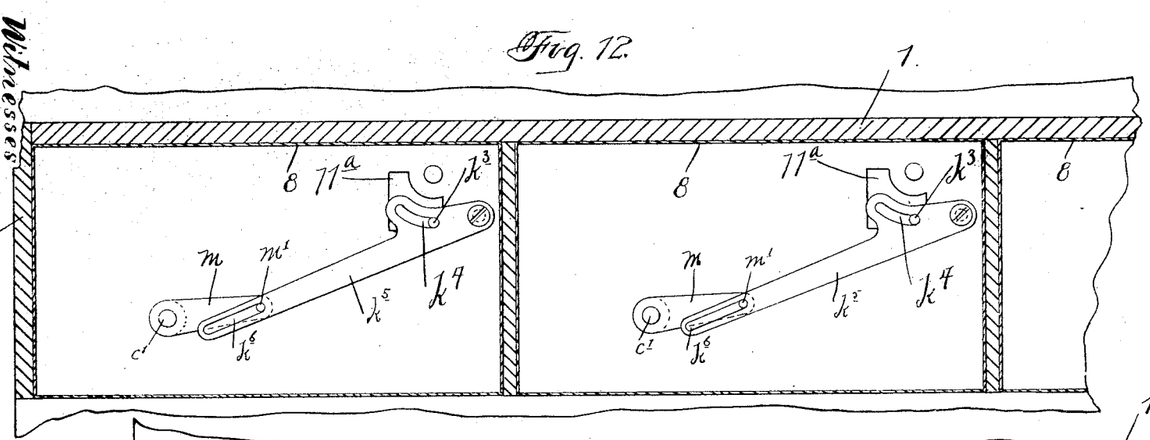
Figs. 12 and 13 are views in horizontal section on the line $x^{12}$ $x^{13}$ of Fig. 11, but illustrating different positions of the parts.
Figure 13:
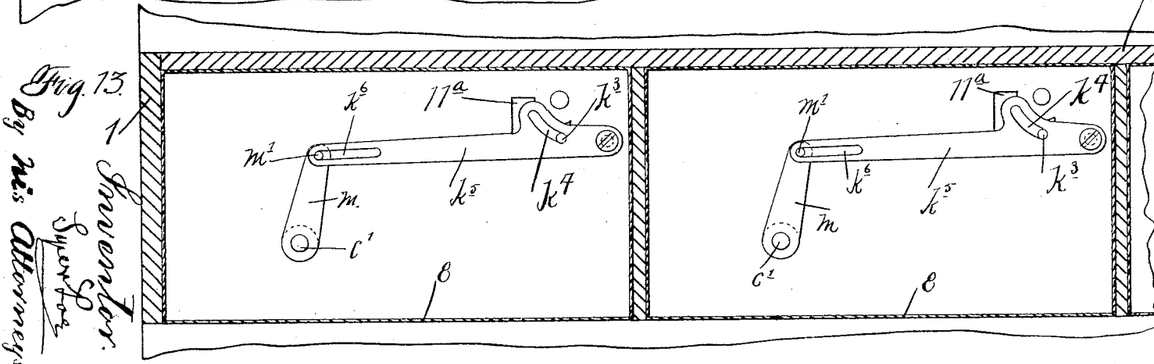

Irregular votes, or votes for parties not represented on the ticket, are cast by dropping the ticket, either in the form of a strip of paper or in the form of a check or disk, through one of the slots 7 and into the drawer 6. Normally these slots 7 are closed by the outer ends of pivoted cut-off levers $k$. Each lever $k$ is secured on the depending end of a rock-shaft $k'$, which extends vertically upward through the corresponding box 8 and is suitably joined in the partition-plates 11. The rock-shaft $k'$ is provided with laterally-projecting pins $k^2$, on which a lock-bar $k^3$ is mounted to slide laterally. The parts $k'\ k^2\ k^3$ constitute what I term a "lock-bail." (Best shown in Figs. 16 and 17.) Normally the lock-bar $k^3$ of the lock-bail stands as indicated in Fig. 5. The ends of the bar $k^3$ are rounded, and they project through holes $11^a$ in the horizontal partitions 11 and work in segmental slots $k^4$ of levers $k^5$, pivoted to the said plates 11. In the normal positions of the levers $k^5$ the slots $k^4$ extend concentrically to the axis of the rock-shaft $k'$, as shown in Figs. 5, 8, and 12. The free ends of the levers $k^5$ are slotted at $k^6$ for a purpose which will presently appear. Such of the actuating-slides $b$ as are appropriated for irregular votes are provided with actuating-lugs $k^7$. (Indicated by dotted lines in Fig. 5.)

To the upper trunnions $c'$ of the several resetting-bars $c$ are rigidly secured arms $m$, having at their free ends pins $m'$, which work in the slots $k^6$ of the upper levers $k^5$. The lower end trunnions $c'$ of said resetting-bar $c$ have rigidly secured to them bell-cranks $m^2$, one arm of each of which is provided with a pin $m^3$, that works in the slots $k^6$ of the lower levers $k^5$. A long link $m^4$ connects the outwardly-projecting arms of the several bell-cranks $m^2$ for common movements. To one of the bell-cranks $m^2$ (the left-hand member is shown in Figs. 8, 9, and 10) a double-ended hand-lever $p$ $p'$ is secured by pin $p^*$. The end $p'$ projects into the booth and the end $p$ projects outside of the booth. Said end $p$ of the hand-lever is provided with a latch $p^2$, which is engageable with one or the other of a pair of notches $p^3$ $p^4$ and a latch-segment $p^5$, suitably secured on the bottom of the lower partition-board 11.

The several printed tickets (indicated by the character $z$) may be held in proper positions on the faces of the several compartment-boxes 8 by means of projecting clips $8^a$. The tickets will of course be so adjusted that the names of the candidates will stand opposite or in line with the key-heads $b'$ of the actuating-slide $b$, which are appropriated to the said candidates.

When an actuating-slide $b$ is moved from its normal into its set position, the cam-surface $b^9$ of the pawl projection $b^2$, acting on the edge of the resetting-bar $c$, throws the pawl $b^2$ out of engagement with the ratchet-teeth $a'$ of the corresponding register, and should the said actuating-slide be returned to its normal position the pawl $b^2$ will, by the said cam-surface, be held inoperative, so that the register will not be moved. When one of the actuating-slides $b$ which is assigned to irregular votes is moved to its set position, its lug $k^7$ will engage the bar $k^3$ and will rock the bail $k'$ $k^2$ $k^3$, so that it can pass under the said bar $k^3$. This movement of the bail moves the head of the lever $k$ from over the slot 7, and thus permits the irregular ballot to be deposited. The spring $k^8$, which acts upon the said arm $k$, immediately restores the said lever and the said bail to their normal positions. When the bail-bar $k^3$ has returned to its normal position, it will stand in the path of movement of these lugs $k^7$, which have been moved in front of the same, and thus serves to prevent the actuating-slides to which said lugs are applied from being returned to normal position at such time. It will of course be understood that the actuating-slides to which the said lugs $k^7$ are applied are like the other slides and that the slides of this particular group will be controlled by limiting stop mechanism, such as employed in connection with the other groups. It is also evident that under the action just described the free ends of the cut-off levers $k$ are moved from over the slots 7 only for an instant. After the voter has set such actuating-slides as represent all of the votes to which he is entitled he takes hold of the end $p'$ of the double-ended hand-lever $p$ $p'$ and moves the same from its normal position into the position indicated in Fig. 12, where it will be locked by the latch $p^2$. This movement of the said hand-lever accomplishes several things, to wit: It rocks the restoring-bar $c$, so that the swinging edge of the same engaging the bearing-surfaces $b^{10}$ of the set-slides $b$ forces the said slides back to their normal position, and it moves the levers $k^5$, so that their segmental slots $k^4$ approach more closely to the axis of the rock-shaft $k'$, thereby pressing the bar $k^3$ out of the path of the lugs $k^7$ of the "irregular actuating-slides" and permitting the same to be returned to their normal positions. When the limiting-ratchets $f^7$ are released from the dogs $b^5$, they fly back to their normal positions under the actions of the springs $f^5$. Attention is here called to the fact that while the beveled detents $b^3$ $b^4$ do not positively lock the actuating-slides to the lock-shoulder $10^b$ they will nevertheless under the actions of the springs $b^8$ prevent the said slide from being thrown back to normal position under the actions of the springs $f^5$.

In the modification illustrated in Fig. 22 the ratchet-dogs $b^5$ are dispensed with and the slides $b$ are operated by pivoted keys or finger-pieces $b^{15}$, pivoted to the box 8, and having a slot and pin in connection $b^{16}$ with the said slides. In this construction the limiting-ratchets $f^3$ instead of being segmental are complete, and they are provided with small pinions $f^{13}$, which mesh with large segmental gears $f^{14}$, pivoted at $f^{15}$ to one of the partitions 10 of the box 8. The slides $b$ themselves are provided with shoulders $b^{17}$, which act as pawls on the teeth of the ratchet-wheels $f^3$ at the lower side thereof. The segmental gears $f^{14}$ are provided with adjustable lock-blocks $f^{16}$, movable in segmental slots $f^{17}$. At the limits of their movements with the gears $f^{14}$ said blocks $f^{16}$ engage a pin $f^{18}$ of a pivoted spring-held lock-bar $f^{19}$. Normally the lock-bar $f^{19}$ permits the free movements of the slides $b$, but when it is engaged by the block $f^{16}$ the rear edge thereof will be forced into engagement with the inclined surfaces $b^{18}$ of the slides $b$, and thereby lock the said slides in their normal positions by holding their detents $b^4$ in engagement with the lock-shoulder $10^b$.

The device just described is intended for use when a very large number of electoral votes must be cast, and in this case all of the wheels $f^3$ must be connected for common rotations. Therefore one pinion $f^{13}$ and one gear $f^{14}$ will answer the purpose, although, if desired, these parts may be duplicated at the opposite ends of the series of actuating-slides.

It will of course be understood that the machine above described is capable of many modifications in the details of its construction within the scope of my invention.

What I claim, and desire to secure by Letters Patent of the United States, is as follows:

1. The combination with a series of registers, of register-actuators adapted to be moved into set positions and to be returned to normal positions individually without actuating said registers, and a restoring device for said actuators rendering said actuators operative on their respective registers under the return movements effected thereby.

2. The combination with a series of registers, of register-actuators movable individually to and from set positions without action on their registers, of a restoring-bar for simultaneously returning the set register-actuators to their normal positions and rendering the same active on their respective registers.

3. The combination with a series of registers, of a series of reciprocating register-actuating slides movable individually to and from set positions without action on their respective registers, and a pivoted restoring-bar operating on said slides to return the same to their normal position and to render the same active on their registers.

4. The combination with a series of registers each having a ratchet-wheel, of a series of reciprocating register-actuating slides having pawls for engagement with said register ratchet-wheels, a restoring-bar normally holding said pawls out of action under the movements of said slide but acting on said slides to return the same to their normal positions and render their pawls operative on the said registers.

5. The combination with a series of registers each having a ratchet-wheel, of a series of reciprocating slides $b$ having the pawls $b^2$, cam-surfaces $b^9$ and bearing-surfaces $b^{10}$, the pivoted restoring-bar $c$ coöperating with said cam-surfaces $b^9$ and bearing-surfaces $b^{10}$, substantially as described.

6. The combination with a series of registers, of a series of register-actuating slides, a pivoted restoring-bar for action on said actuating-slides, and a series of pivoted cam-heads on said restoring-bar, acting as an interlocking device for said slides and movable to and from operative positions by said restoring-bar.

7. The combination with a series of registers, of a series of register-actuating slides, a pivoted restoring-bar for action on said slides, a series of pivoted cam-heads $d$ on said restoring-bar movable thereby into and out of operative positions, and cam-studs $d'$ on said slides coöperating with said cam-heads to permit only one slide to be moved at a time, substantially as described.

8. The combination with a series of registers, of a series of register-actuating slides movable individually to and from set positions without operation on said registers and having detents for holding them in both positions, springs coöperating with said detents to hold the slides where set, and a restoring-bar for simultaneous action on the said slides.

9. The combination with a series of registers and register-actuating slides subgrouped for the different offices, of a limiting-lock for each group having ratchet-teeth directly subject to each actuator and provided with parts, which, when the proper predetermined number of votes have been cast for the particular office, lock the remaining actuating-slides of the group in their normal position.

10. The combination with a series of registers and register-actuating slides subgrouped for the different offices, of a limiting-lock for each group comprising a plurality of ratchet-wheels mounted for common rotation and subject to pawl-acting portions of said actuating-slides, and lock-lugs on said ratchet-wheels, which, by a predetermined number of movements, engage and lock such of the actuating-slides of the group as are left in normal position.

11. The combination with a series of registers, of a corresponding series of register-actuating slides yieldingly held in their normal positions by detents from which they may be released by lateral movement, of a limiting-lock movable step by step under the action of the slides of the group and provided with lock-lugs, which lugs, by a predetermined number of movements, engage such of the said slides as are left in normal position and hold the same against the lateral movement necessary to release them.

12. The combination with a series of registers, of a series of register-actuating slides $b$ having detents $b^4$ and shoulder lock-lugs $b^{12}$ $b^{13}$, a support in which said slides $b$ are movable, provided with the shoulder $10^b$ for coöperation with said detents $b^4$, and a limiting-lock involving a group of ratchet-wheels $f^3$, connected for common rotation and provided with the lock-lugs $f^6$, coöperating with said shoulders $b^{12}$ $b^{13}$ to lock the slides, which ratchet-wheels are movable step by step by the set slides.

13. The combination with a series of registers and register-actuating slides, grouped for the different offices, of a limiting-lock comprising a group of ratchet-wheels connected for common rotation and provided with lock-lugs, which, by a predetermined movement, lock the said slides in their normal positions, and dogs pivoted to said actuating-slides for action on said ratchet-wheels, substantially as described.

14. The combination with a series of registers, of a series of register-actuators, movable individually to and from set positions without action on said registers, a limiting-lock subject to a plurality or group of said actuators and operating under the action of a predetermined number of said actuators, to lock in normal position the rest of the actuators of the group, and means for simultaneously returning the said actuators to their normal positions and causing the same under such return movement, to operate their respective registers.

15. The combination with a series of registers, of a series of register-actuating slides movable individually to and from set position without action on said registers, a limiting-lock subject to a plurality of said actuating-slides and operating under the action of a predetermined number thereof, to lock in normal position other slides of the group, which lock automatically returns to normal position when the slides of the group are returned to normal position, and a restoring-bar for returning the set slides to their normal positions and permitting them, under such return movements, to operate their respective registers.

16. The combination with a series of registers, of a series of register-actuating slides movable individually to and from set positions without action on said registers, a limiting-lock comprising the group of ratchet-wheels movable step by step under the action of said actuating-slides and provided with lock-lugs, which, by predetermined number of movements, lock the unset slides of the group in their normal positions, a spring for returning said limiting-lock to normal position when the set slides are returned to normal positions, and a pivoted restoring-bar, which, under its restoring movement, renders said slides operative on their respective registers.

17. The combination with a group of registers and register-actuators, of a limiting-lock, which, under the action of a predetermined number of said actuators, locks the remainder thereof in their normal positions, said lock comprising a plurality of ratchet-wheels, a pinion driven by said ratchet-wheels, a relatively large gear meshing with said pinion, and an adjustable lock-actuating lug or block carried by said large gear, substantially as described.

18. The combination with a series of registers, of a series of register-actuating slides, a shaft or spindle extending transversely of said slides, a series of spacing-thimbles loose on said spindle, and a series of ratchet-wheels on said spindle subject to said actuating-slides and provided with reversely-projecting lugs which engage seats or recesses in the adjacent spacing-thimbles to lock the said wheels in groups for common rotation, which ratchet-wheels are further provided with lock-lugs which engage and lock the said slides by a predetermined movement, substantially as described.

19. The combination with a series of registers, of a series of register-actuating slides, a receptacle for irregular ballots having an entrance-passage, a cut-off blade or arm for opening and closing said passage, a rock-shaft connected with said cut-off blade, lugs on certain of the actuating-slides operating on said rock-shaft, to rock the same, and in turn to be locked thereby, and means for returning said parts to their normal positions, substantially as described.

20. The combination with a series of registers and register-actuating slides, of the rock-shaft $k'$ provided with radially-movable lock-bar $k^3$, lugs $k^7$ on certain of said actuating-slides operating on said bar $k^3$ and in turn locked thereby in set positions, a receptacle for irregular ballots provided with an entrance-slot, a cut-off blade or arm for opening and closing said entrance-slot secured to one end of said rock-shaft $k'$, and means for moving the said bar $k^3$ toward the axis of said shaft $k'$ to simultaneously release the set irregular-vote slides, substantially as described.

21. The combination with a series of registers and register-actuators which actuators are adapted to be moved into set positions, of a restoring device for returning said set actuators to their normal positions and rendering the same operative on said registers, means for operating said restoring device involving a controller having two handpieces and a lock, one handpiece being located within the reach of the voter while standing at the machine and the other extending out of his reach.

22. The combination with a booth, of a voting-machine comprising a series of registers, a series of actuating-slides, a restoring-bar for action on the said actuators to return the same to their normal positions and render the same active on their respective registers, and means for moving said restoring-bar comprising a double-ended lever provided with a lock, one end of this lever may be reached by the voter from within the booth and the other end of which is extended out of the voter's reach, substantially as described.

In testimony whereof I affix my signature in presence of two witnesses.

SYVER LOE.

Witnesses:
HARRY KILGORE,
F. D. MERCHANT.